(12) United States Patent
Yamakado

(10) Patent No.: US 7,612,916 B2
(45) Date of Patent: Nov. 3, 2009

(54) IMAGE PROCESSING DEVICE, IMAGE PROCESSING METHOD, AND COMPUTER PROGRAM

(75) Inventor: Hitoshi Yamakado, Hino (JP)

(73) Assignee: Seiko Epson Corporation (JP)

( * ) Notice: Subject to any disclaimer, the term of this patent is extended or adjusted under 35 U.S.C. 154(b) by 730 days.

(21) Appl. No.: 11/300,106

(22) Filed: Dec. 14, 2005

(65) Prior Publication Data

US 2006/0164689 A1    Jul. 27, 2006

(30) Foreign Application Priority Data

Jan. 24, 2005    (JP)    ............... 2005-015453

(51) Int. Cl.
  *G06K 15/00*    (2006.01)
  *H04N 1/405*    (2006.01)
  *G06K 9/40*    (2006.01)

(52) U.S. Cl. .............. 358/3.03; 358/1.9; 358/3.06; 358/3.24; 358/3.26; 358/534; 382/251; 382/252; 382/254

(58) Field of Classification Search .............. 358/1.9, 358/3.03–3.06, 534, 536; 382/252; 345/616
See application file for complete search history.

(56) References Cited

U.S. PATENT DOCUMENTS

| | | | | |
|---|---|---|---|---|
| 5,170,257 A | * | 12/1992 | Burns | ............ 358/3.21 |
| 5,394,250 A | * | 2/1995 | Shono | ............ 358/3.03 |
| 5,805,724 A | * | 9/1998 | Metcalfe et al. | ............ 382/176 |
| 6,108,452 A | * | 8/2000 | Ilbery | ............ 382/252 |
| 6,760,125 B1 | * | 7/2004 | Hayama | ............ 358/1.9 |
| 7,110,141 B2 | * | 9/2006 | Yamamoto | ............ 358/1.9 |
| 7,161,711 B2 | * | 1/2007 | Mori et al. | ............ 358/1.9 |
| 7,286,268 B2 | * | 10/2007 | Yamamoto | ............ 358/3.22 |

OTHER PUBLICATIONS

Robert W. Floyd and Louis Steinberg, An Adaptive Algorithm for Spatial Greyscale, Proceeding of the S.I.D. vol. 17/2, Second Quarter 1976, pp. 75-77.

* cited by examiner

*Primary Examiner*—King Y Poon
*Assistant Examiner*—Richard Z Zhu
(74) *Attorney, Agent, or Firm*—Harness, Dickey & Pierce, P.L.C.

(57) ABSTRACT

An image processing device includes a memory that is adapted to store an input image; an inverted image generator that is adapted to generate an inverted image, the inverted image corresponding to a predetermined part of the input image; a target image generator that is adapted to generate a target image, the target image including the inverted image and the input image; a quantization unit that is adapted to quantize the target image, in accordance with the error diffusion method; an image extractor that is adapted to extract an output image from the quantized target image, the output image corresponding to the input image; an output unit that is adapted to output the output image extracted by the image extractor.

7 Claims, 4 Drawing Sheets

IMAGE PROCESSING DEVICE, IMAGE PROCESSING METHOD, AND COMPUTER PROGRAM

The entire disclosure of Japanese Patent Application No. 2005-015453, filed on Jan. 24, 2005 is expressly incorporated by reference herein.

BACKGROUND

1. Technical Field

The present invention relates to image processing using an error diffusion method. Specifically, the present invention relates to an image processing device, an image processing method, and a program that can prevent so-called "dot generation delay", which occurs when converting M-level image data into N-level image data, by using the error diffusion method.

2. Related Art

An error diffusion method is an image processing method for converting gradation value of a pixel of M-level image data into a pixel of N-level image data. Here, M and N are integers that satisfy M>N. An error diffusion method is disclosed in, for example, "An Adaptive Algorithm for Spatial Gray Scale", Society for Information Display 1975 Symposium Digest of Technical Papers, published by the Society for Information Display, 1975, p. 36.

Here, a summary of an error diffusion method will be described.

FIG. 7 shows an order of image processing by an error diffusion method. FIG. 8 shows an example of an error diffusion matrix. According to the error diffusion method, the image processing is started with the top left pixel of an image. First, the pixels of the top line are processed one by one, from left to right. After the top line is completed, the pixels of the second line are processed one by one, from left to right. Here, an explanation will be given of an example of converting 16-level image data into binary image data (in other words, 2-level image data). In a case that a gradation value of a target pixel is below a threshold value, the binarized gradation value is determined as "0". In other words, no ink dot is formed at a location corresponding to the target pixel. On the contrary, in a case that a gradation value of a target pixel is above the threshold value, the binarized gradation value is determined as "1". In other words, an ink dot is formed at a location corresponding to the target pixel. As a result of binarization, an error, which is a difference between gradation values before and after the binarization, is generated. The generated error is diffused into peripheral unprocessed pixels in accordance with the error diffusion matrix shown in FIG. 8. In the peripheral pixels, a gradation value is updated by addition of the diffused error. The error diffusion method is an image processing method to make macroscopic density of an output image to be equal to that of the input image.

SUMMARY

In an area near the starting point of the image processing, that is, in the above example, at the top left part of the image, a small number of errors are added because only a small number of pixels have been previously processed. For example, in a case that successive pixels having a gradation value below the threshold value exist, an ink dot is not formed until sufficient errors are added. This phenomenon is known as "dot generation delay". Dot generation delay causes a binarized image to be nonuniform. In other words, dot generation delay causes deterioration of image quality.

An advantage of some aspects of the invention is that it prevents dot generation delay in an area near the starting point of the image processing.

According to an aspect of the invention, an image processing device comprises: a memory that is adapted to store an input image; an inverted image generator that is adapted to generate an inverted image, the inverted image corresponding to a predetermined part of the input image; a target image generator that is adapted to generate a target image, the target image including the inverted image and the input image; a quantization unit that is adapted to quantize the target image, in accordance with the error diffusion method; an image extractor that is adapted to extract an output image from the quantized target image, the output image corresponding to the input image; an output unit that is adapted to output the output image extracted by the image extractor.

According to the image processing device, a certain amount of errors are added to the pixels near the original start point before the pixels are processed. Therefore, the image processing device can prevent dot generation delay.

It is preferable that the inverted image generator generates an inverted image, the inverted image being an image axially symmetrical to the input image, the axis being defined by a start point of the quantization and a direction in which the quantization proceeds, the inverted image having a length (or a width) of a-line, a being a predetermined positive integer.

It is preferable that the inverted image generator generates an inverted image, the inverted image being an image axially symmetrical to the input image, the axis being defined by a start point of the quantization and a direction orthogonal to a direction in which the quantization proceeds, the inverted image having a length (or a width) of a-line, a being a predetermined positive integer.

It is preferable that the inverted image generator generates: (a) a first inverted image, the first inverted image being an image axially symmetrical to the input image, the axis being defined by a start point of the quantization and a direction in which the quantization proceeds, the inverted image having a length (or a width) of a-line, a being a predetermined positive integer; and (b) a second inverted image, the second inverted image being an image axially symmetrical to the input image, the axis being defined by a start point of the quantization and a direction orthogonal to a direction in which the quantization proceeds, the inverted image having a length (or a width) of b-line, b being a predetermined positive integer.

It is preferable that the image-processing device is an ink jet printer.

According to further aspect of the invention, an image processing method comprises: storing an input image; generating an inverted image, the inverted image corresponding to a predetermined part of the input image; generating a target image, the target image including the inverted image and the input image; quantizing the target image in accordance with the error diffusion method; extracting an output image from the quantized target image, the output image corresponding to the input image; and outputting the output image extracted by the image extractor.

According to further aspect of the invention, a computer program causes a computer device to execute: storing an input image; generating an inverted image, the inverted image corresponding to a predetermined part of the input image; generating a target image, the target image including the inverted image and the input image; quantizing the target image in accordance with the error diffusion method; extracting an output image from the quantized target image, the output image corresponding to the input image; and outputting the output image extracted by the image extractor.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described with reference to the drawings.

Figure 1:
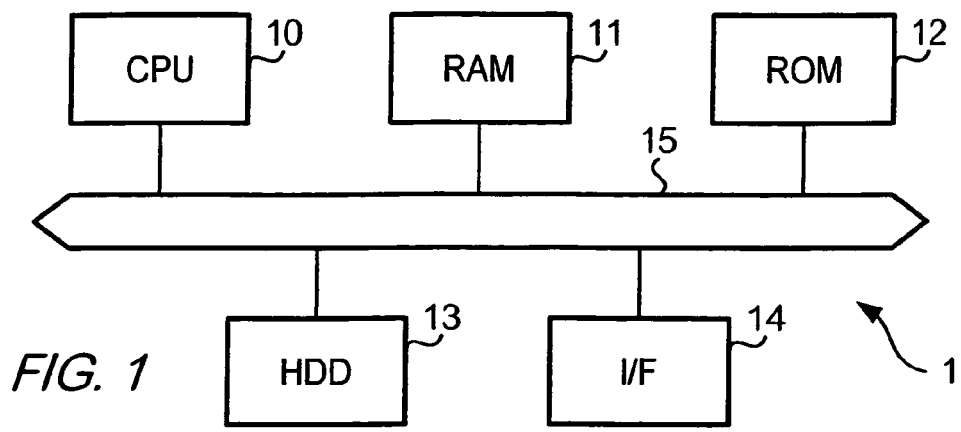
FIG. 1 shows a hardware configuration of image processing device 1.

FIG. 1 shows a hardware configuration of image processing device 1 in accordance with the present embodiment. CPU (Central Processing Unit) 10 executes a program stored in ROM (Read Only Memory) 12 or HDD (Hard Disk Drive) 13. RAM 11 functions as a work area of CPU 10. HDD 13 stores an image-processing program in accordance with the present embodiment. Image-processing device 1 binarizes image data in accordance with the image-processing program. The image data is input via I/F (interface) 14. Image processing device 1 outputs binarized image data to another device via I/F 14. The elements are connected to each other via bus 15.

Figure 2:
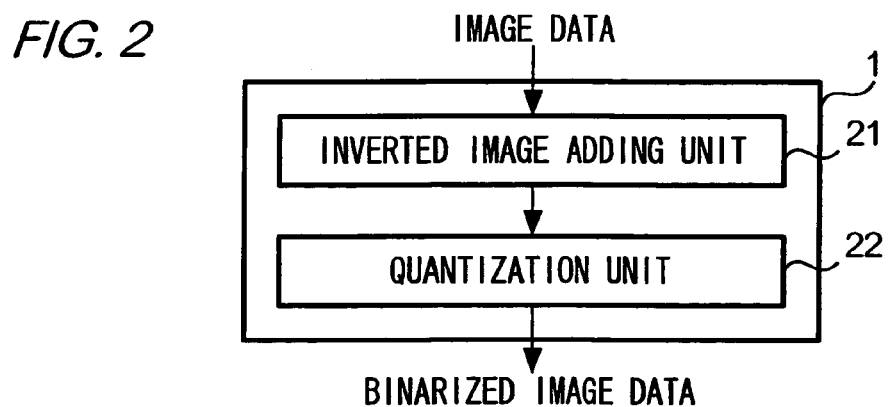
FIG. 2 shows a functional configuration of image processing device 1.

FIG. 2 shows a functional configuration of image processing device 1. Inverted image adding unit 21 performs an inverted image adding operation for image data input to image processing device 1. Details of the inverted image adding operation will be described later. Quantization unit 22 quantizes the image data to which the inverted image is added. In the present embodiment, quantization unit 22 binarizes the image data.

As shown in FIG. 1, image-processing device 1 is a computer device such as a personal computer. Image-processing device 1 functions as shown in FIG. 2 by executing the image-processing program with CPU 10.

Figure 3:
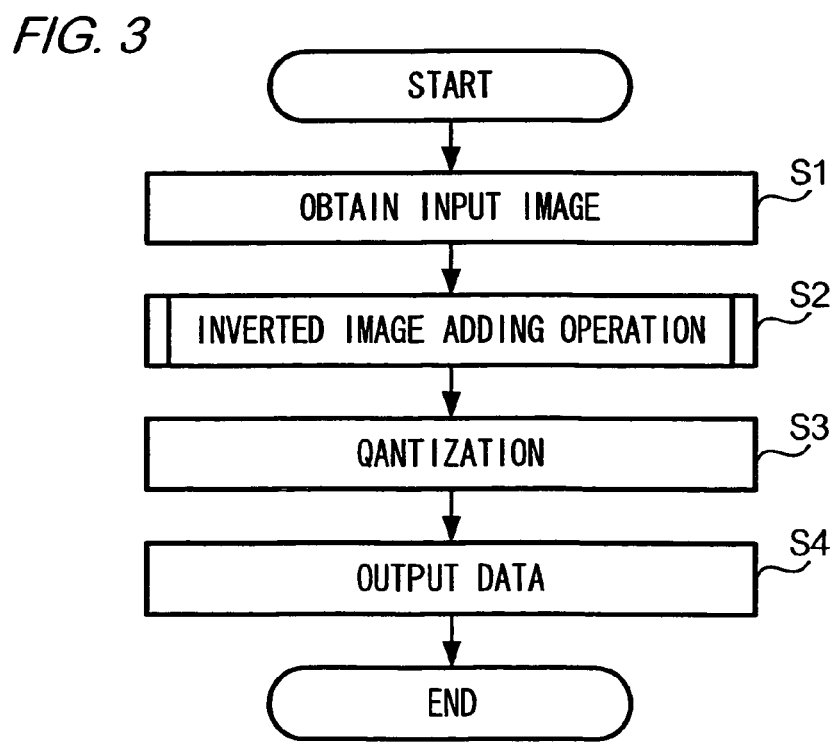
FIG. 3 shows a flow chart illustrating operations of image-processing device 1.

FIG. 3 shows a flow chart illustrating operations of image-processing device 1. When power is supplied from a power source (not shown in the figures), CPU 10 reads from HDD 13 and executes the image-processing program. By executing the image-processing program, CPU 10 is switched to a stand-by state to input image data. When image data is input, CPU 10 stores input image data in RAM 11 in step S1. Hereinafter, the input image data is referred to as "image D". In step S2, CPU 10 performs the inverted image adding operation for image D. In step S3, CPU 10 performs binarization for image data processed by the inverted image adding operation. Hereinafter, the image data after the inverted image adding operation is referred to as "image E". Image processing device 1 can employ a well-known binarization algorithm. In the present embodiment, binarization starts from the top left pixel of the image and proceeds to the right. In step S4, CPU 10 outputs via I/F 14 image data generated by binarization.

Now, details of the inverted image adding operation will be described.

Figure 4:
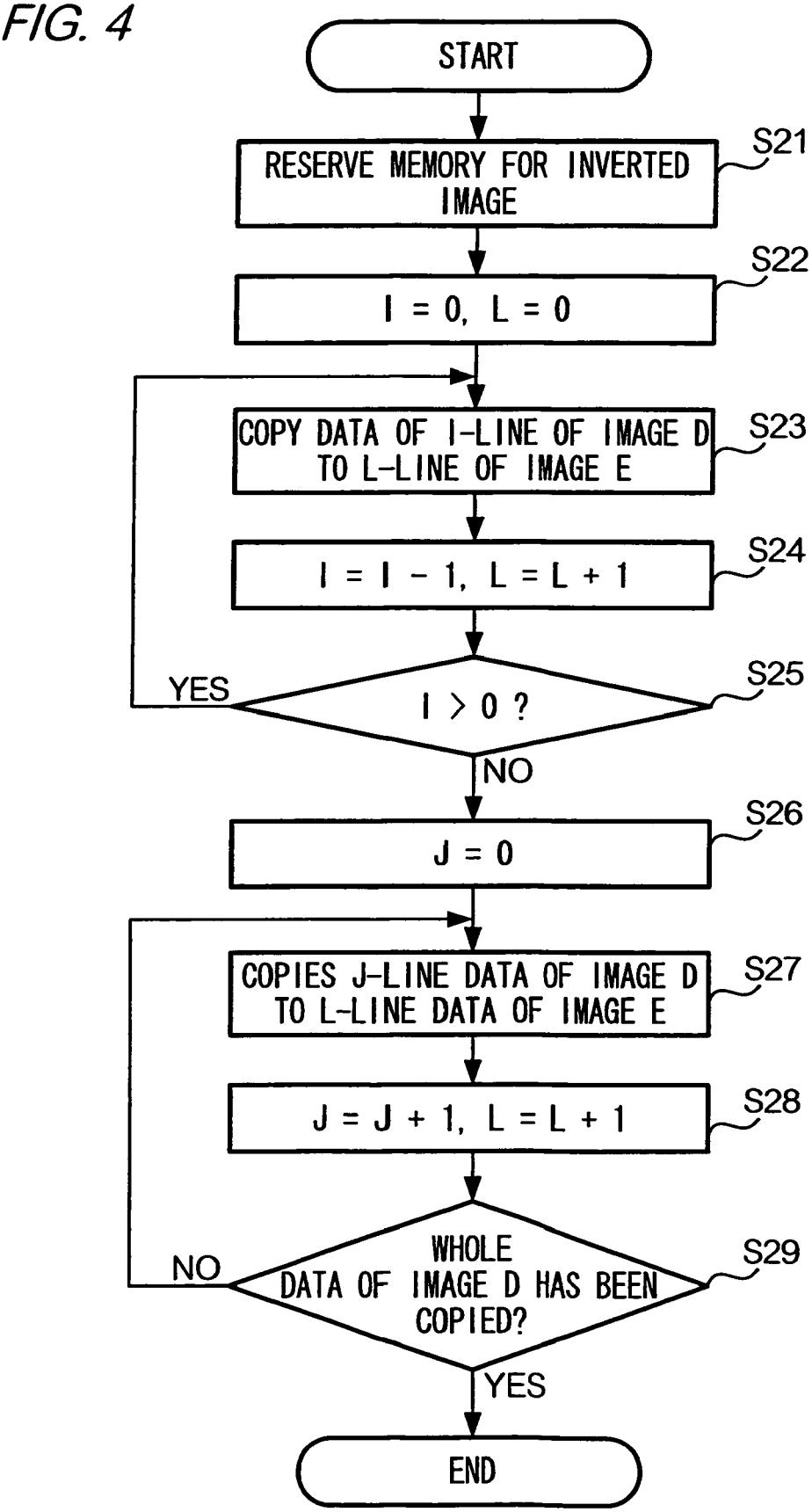
FIG. 4 shows a flow chart illustrating the inverted image adding operation.
Figure 5:
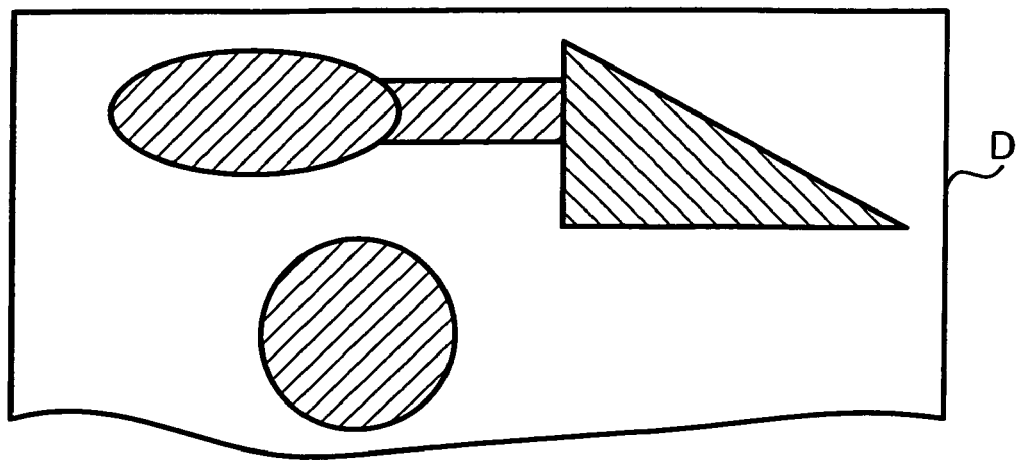
FIG. 5 shows an example of image. D.

FIG. 4 shows a flow chart illustrating the inverted image adding operation. FIG. 5 shows an example of image D. In step S21, when image D is input, CPU 10 reserves in RAM 11 a storage area for image E. Further, CPU 10 reserves in RAM 11 storage area for parameters I and L. Parameters I and L are used for the inverted image adding operation. Next, in step S22, CPU 10 initializes parameters I and L, as I=a and L=0. Here, a is a constant defined by the image processing program.

First, an inverted image of a target area is generated. The "target area" is a part of image D and is determined by the positional relationship with the start point of the image processing. In the present embodiment, the target area is determined by the start point of binarization, the top left pixel of the image. An axial symmetry image, for which the symmetry axis is the top line of the image, is generated as the inverted image. In the following description, "a-line data" of image D means data of a line of pixels identified by parameter a. For example, when a=0, a-line is the top line of image D. Also, when a=1, a-line is the second line of image D.

In step S23, CPU 10 copies data of I-line of image D to storage area of L-line of image E. In other words, first, data of a-line of image D is stored as data of the top line of image E. Next, in step S24, CPU 10 updates parameters I and L in accordance with predetermined equations, I=I−1 and L=L+1. Next, in step S25, CPU 10 determines whether parameter I satisfies a predetermined condition, I>0. In other words, CPU 10 determines whether generation of an inverted image corresponding to from 0 to a-line of image D has been completed. In a case that the generation of inverted image is not completed (in step S25: YES), CPU 10 repeats the operations of steps S23-S24. Thus, an inverted image corresponding to from 0 to a-line of image D is generated.

When completing generation of the inverted image (in step S25: YES), CPU 10 stores data of image D subsequent to storing data of the inverted image, thereby generating image E. Details of the operation are as follows.

CPU 10 reserves in RAM 11 a storage area for parameter J, which is a parameter used for inverted image adding operations. Next, in step S26, CPU 10 initializes parameter J as zero. In step S27, CPU 10 copies J-line data of image D to L-line data of image E. Next, in step S28, CPU 10 updates parameters J and L in accordance with predetermined equations, J=J+1 and L=L+1. Next, in step S29, CPU 10 determines whether parameter J satisfies a predetermined condition that the whole data of image D has been copied to the storage area of image E. In a case that the whole data of image D has not been copied to the storage area of image E (in step S29: NO), CPU 10 repeats the operations of steps S27-S28 until the whole data of image D is copied to the storage area. When the whole data of image D has been copied to the storage area (in step S29: YES), CPU 10 terminates the inverted image adding operation. According to the inverted image adding operation, image E, which is an image to be processed, is generated from the input image.

Figure 6:
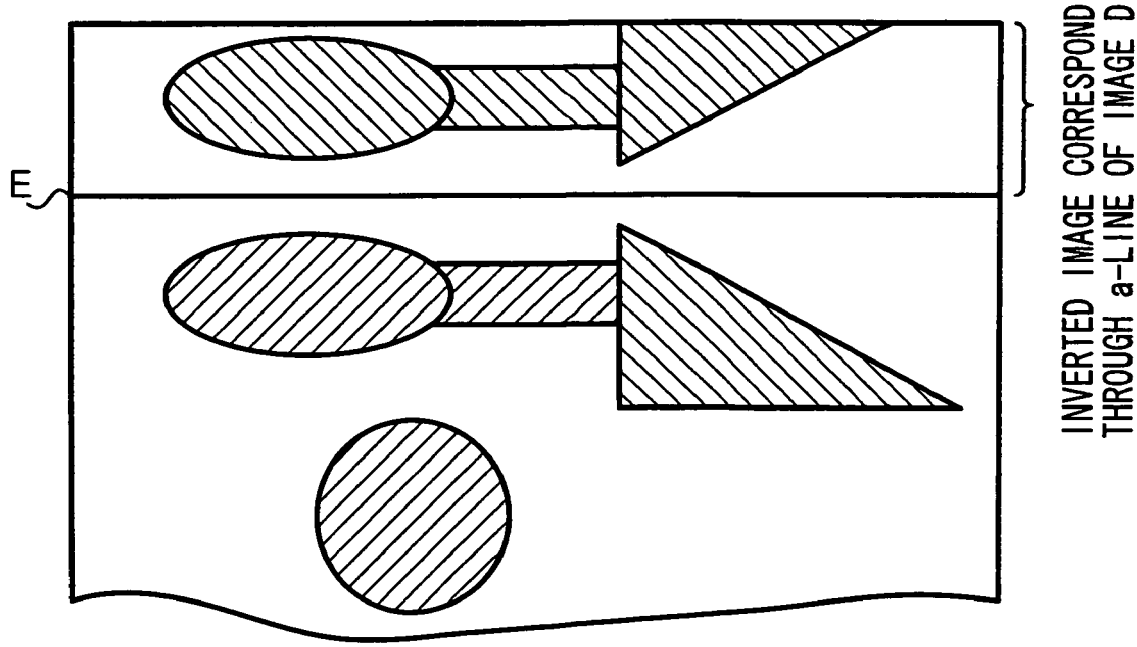
FIG. 6 shows an example of image E generated from image D shown in FIG. 5.
Figure 7:
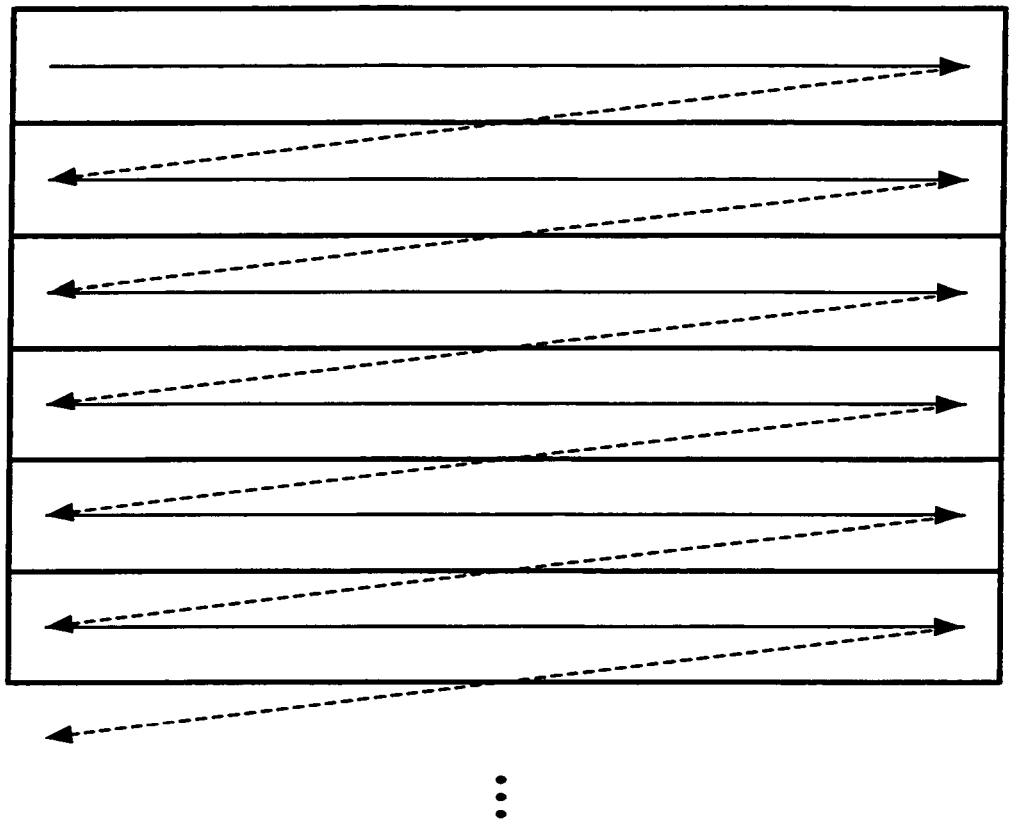
FIG. 7 shows an order of image processing by an error diffusion method.
Figure 8:
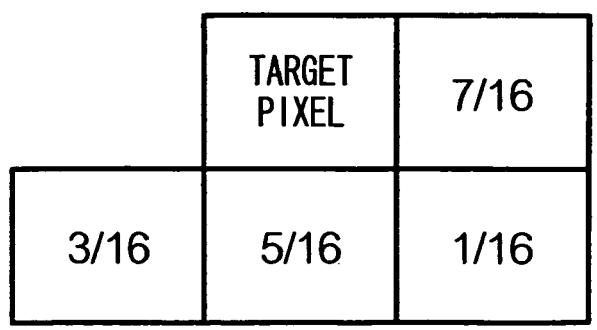
FIG. 8 shows an example of an error diffusion matrix.

FIG. 6 shows an example of image E generated from image D shown in FIG. 5. Image E includes the inverted image corresponding to from 0 to a-line of image D.

The operations of the image-processing device will now be described, again with reference to FIG. 3. In step S3, CPU 10 performs quantization of image E. Here, quantization is performed for an image to which the inverted image is added. A certain amount of errors are added to the pixels near the original start point before the pixels are processed, to thereby enable the image-processing device to prevent dot generation delay. In addition, the added image has characteristics similar to the input image, because the added image is an inverted image of a part of the input image. The added errors correspond to image D, the input image. Thus, CPU 10 quantizes image E.

Next, in step S4, CPU 10 extracts from quantized image E a part of an image corresponding to the original input image, image D. Image E includes the inverted image as well as image D. The inverted image is unnecessary when outputting an image. Therefore, CPU 10 eliminates an area corresponding to the inverted image in the following manner. CPU 10 reserves a storage area for an output image. CPU 10 copies the output image (a+1) to the bottom line of image E. After completing the copy, CPU 10 outputs the output image via I/F 14.

The invention is not restricted to the above-described embodiment, and various modifications can be applied to the embodiment.

In the above embodiment, the added image is an inverted image of a part of image D. Specifically, the added image is an image axially symmetrical to a line. The line starts from the start point of the image processing and extends in a direction in which the image processing proceeds, but the added image is not restricted in the same way. For example, the added image may be an image axially symmetrical to a line, which starts from the start point of the image processing and extends in a direction orthogonal to the direction in which the image processing proceeds. Alternatively, the added image may include both (a) an image axially symmetrical to a line, which starts from the start point of the image processing and extends in a direction in which the image processing proceeds, and (b) an image axially symmetrical to a line, which starts from the start point of the image processing and extends in a direction orthogonal to the direction in which the image processing proceeds. The height (or length) of the added images may be different from each other.

In the above embodiment, image-processing device 1 is a computer device such as a personal computer. However, the image-processing device may be included in an image-forming device such as an ink jet printer. In this case, image data may be input from another device connected to the image forming device via a wired or wireless network, or directly. The image-forming device forms an image in accordance with the output image generated by the above-described operations.

In the above embodiment, the functions of the image-processing deice are realized by CPU 10 executing an image-processing program. However, the functions may be realized by hardware such as integrated circuits.

In the above embodiment, quantization is binarization. However, quantization may be N-level quantization that converts M-level image data into N-level image data. Here, M and N satisfy M>N.

In a case that the input image is a color image, the above-described operation may be applied to each component of the input image, for example RGB or CMYK.

What is claimed is:

1. An image processing device, comprising: a memory configured to store an input image;

an inverted image generator configured to generate an inverted image, the inverted image corresponding to a predetermined part of the input image;

a target image generator configured to generate a target image by combining, the inverted image and the input image;

a quantization unit configured to quantize the target image, in accordance with the error diffusion method;

an image extractor configured to extract an output image from the quantized target image, the output image corresponding to the input image; and an output unit configured to output the output image extracted by the image extractor;

wherein the target image generator generates the target image including at least one of a first inverted image and a second inverted image, the first inverted image being an image axially symmetrical to the input image, the axis being defined by a start point of the quantization and a direction in which the quantization proceeds, the first inverted image having a length (or a width) of a-line, a being a predetermined positive integer; and the second inverted image being an image axially symmetrical to the input image, the axis being defined by a start point of the quantization and a direction orthogonal to a direction in which the quantization proceeds, the second inverted image having a length (or a width) of b-line, b being a predetermined positive integer.

2. An image processing device according to claim 1, wherein the inverted image generator generates an inverted image, the inverted image being an image axially symmetrical to the input image, the axis being defined by a start point of the quantization and a direction in which the quantization proceeds, the inverted image having a length (or a width) of a-line, a being a predetermined positive integer.

3. An image processing device according to claim 1, wherein the inverted image generator generates an inverted image, the inverted image being an image axially symmetrical to the input image, the axis being defined by a start point of the quantization and a direction orthogonal to a direction in which the quantization proceeds, the inverted image having a length (or a width) of a-line, a being a predetermined positive integer.

4. An image processing device according to claim 1, wherein the inverted image generator generates:

(a) a fast inverted image, the first inverted image being an image axially symmetrical to the input image, the axis being defined by a start point of the quantization and a direction in which the quantization proceeds, the inverted image having a length (or a width) of a-line, a being a predetermined positive integer; and (b) a second inverted image, the second inverted image being an image axially symmetrical to the input image, the axis being defined by a start point of the quantization and a direction orthogonal to a direction in which the quantization proceeds, the inverted image having a length (or a width) of b-line, b being a predetermined positive integer.

5. An image processing device according to claim 1, wherein the image-processing device is an ink jet printer.

6. An image processing method, comprising:

storing an input image;

generating an inverted image, the inverted image corresponding to a predetermined part of the input image;

generating a target image, by combining the inverted image and the input image;

quantizing the target image in accordance with the error diffusion method;

extracting an output image from the quantized target image, the output image corresponding to the input image; and outputting the output image extracted by the image extractor;

wherein a target image generator generates the target image including at least one of a first inverted image and a second inverted image, the first inverted image being an image axially symmetrical to the input image, the axis being defined by a start point of the quantization and a direction in which the quantization proceeds, the first inverted image having a length (or a width) of a-line, a being a predetermined positive integer; and the second inverted image being an image axially symmetrical to the input image, the axis being defined by a start point of the quantization and a direction orthogonal to a direction in which the quantization proceeds, the second inverted image having a length (or a width) of b-line, b being a predetermined positive integer.

7. A computer readable storage medium storing a program causing a computer device to execute a process, the process comprising:

an input image;

generating an inverted image, the inverted image corresponding to a predetermined part of the input image;

generating a target image, by combing the inverted image and the input image;

quantizing the target image in accordance with the error diffusion method;

extracting an output image from the quantized target image, the output image corresponding to the input image; and outputting the output image extracted by the image extractor;

wherein the target image including at least one of a first inverted image and a second inverted image, the first inverted image being an image axially symmetrical to the input image, the axis being defined by a start point of the quantization and a direction in which the quantization proceeds, the first inverted image having a length (or a width) of a-line, a being a predetermined positive integer; and the second inverted image being an image axially symmetrical to the input image, the axis being defined by a start point of the quantization and a direction orthogonal to a direction in which the quantization proceeds, the second inverted image having a length (or a width) of b-line, b being a predetermined positive integer.

* * * * *